Dec. 6, 1966   B. H. KAMENS   3,290,573
MOTOR OPERATING CIRCUIT
Filed Sept. 30, 1963

INVENTOR.
BRUCE H. KAMENS
BY

ATTORNEY

United States Patent Office 3,290,573
Patented Dec. 6, 1966

3,290,573
MOTOR OPERATING CIRCUIT
Bruce H. Kamens, Thomaston, Conn., assignor to Consolidated Electronics Industries Corp., Waterbury, Conn., a corporation of Delaware
Filed Sept. 30, 1963, Ser. No. 312,532
8 Claims. (Cl. 318—171)

This invention relates to circuit means for converting D.C. voltages to A.C. voltages, commonly termed "inverters."

It is an object of the present invention to provide novel and highly efficacious transistorized D.C. to A.C. inverters.

It is another object of the present invention to provide inverters of this type which are particularly suited for use as operating circuit means for small synchronous motors.

Still another object of the present invention is the provision of such inverters which may be employed as motor starting circuits without utilizing intermediate output transformer means.

A further object of the present invention is the provision of transistorized D.C. to A.C. inverters which are operable at low output frequencies.

Figure 1:
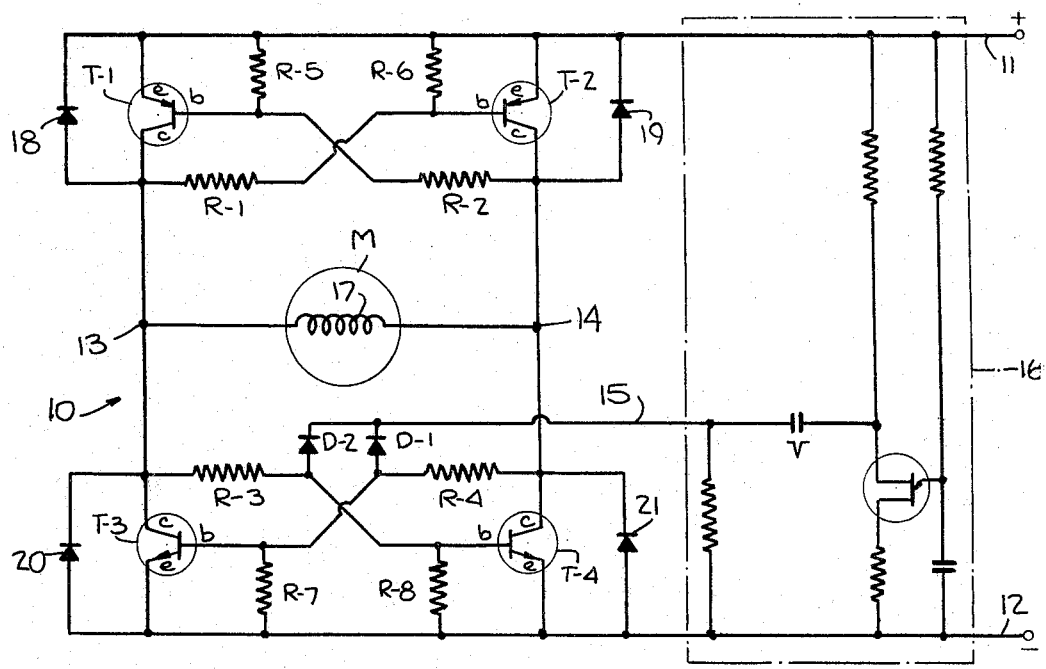
Figure 2:
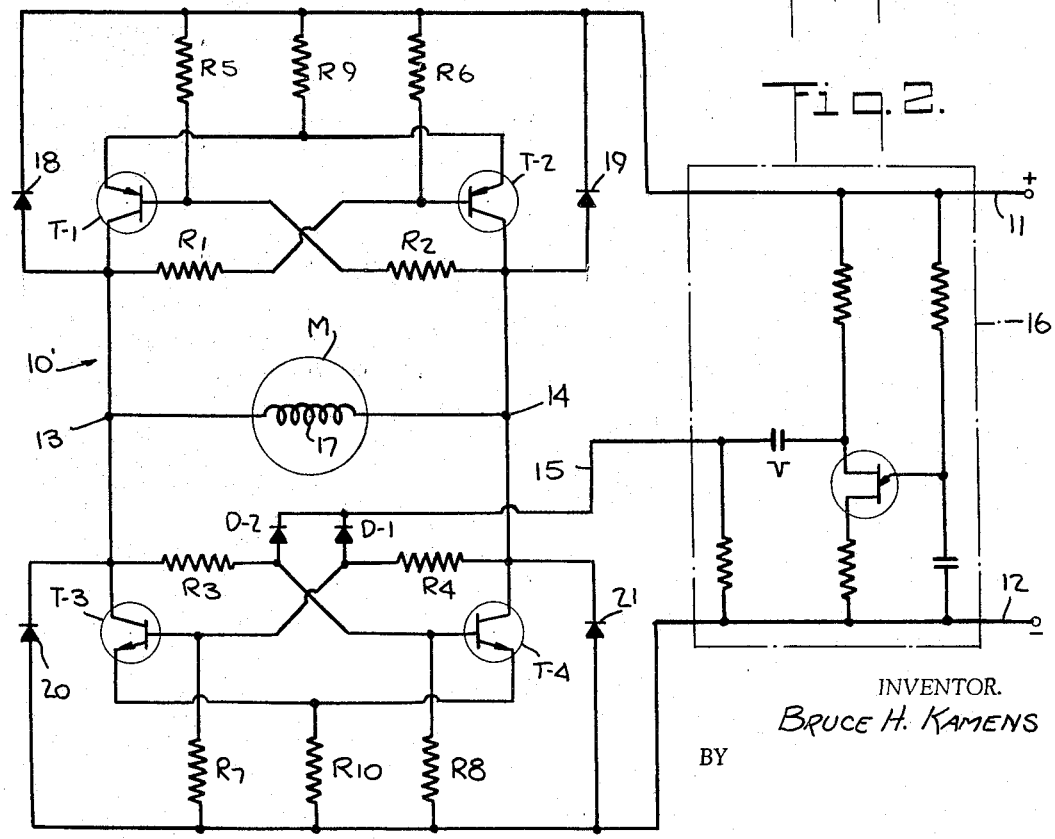

The foregoing and other objects and characteristics of the present invention, as well as the advantages accruing therefrom, will be more fully understood from the following detailed description of preferred embodiments of the present invention when read in conjunction with the accompanying drawings, in which:

FIG. 1 is a wiring diagram of one embodiment of the inverter circuitry of the present invention; and FIG. 2 is a wiring diagram of the inverter circuitry modified somewhat in accordance with another embodiment of the present invention.

In accordance with the basic aspects of the present invention, an inverter circuit as contemplated comprises a pair of complementary flip-flops connected back-to-back so as to form a bridge circuit. One of the flip-flops includes two cross-coupled PNP transistors, and the other flip-flop includes two NPN transistors, with the two transistors of each flip-flop connected in a common-emitter configuration. A source of D.C. voltage is connected to the pair of input terminals of the bridge constituted by the two emitter junctions, and the output of the bridge is taken from the terminals thereof constituted by the respective junctions between the collectors of the two pairs of transistors. An oscillator arranged to provide trigger signals of predetermined polarity and frequency is coupled to one of the flip-flops.

Although the inverter circuitry of the present invention is described hereinafter particularly with reference to the operation of small synchronous motors at relatively low frequencies, preferably less than 1000 c.p.s., it is to be understood that this description is not intended to be limitative and that the invention is of broad and general utility and of a scope commensurate with that of the claims appended hereto.

Referring now first to FIG. 1, an inverter circuit 10 according to the present invention comprises a pair of PNP transistors T-1 and T-2 and a pair of NPN transistors T-3 and T-4, each having a base b, an emitter e, and a collector c. The PNP transistors T-1 and T-2 are connected in a common-emitter configuration, as are the NPN transistors T-3 and T-4. The emitters of these two pairs of transistors are connected, respectively, to the positive and negative terminals 11 and 12 of a D.C. voltage source. The collectors of the transistors T-1 and T-2 are cross-coupled to the bases of the transistors T-2 and T-1, respectively, through resistors R-1 and R-2. Similarly, the collectors of the transistors T-3 and T-4 are cross-coupled to the bases of the transistors T-4 and T-3, respectively, through resistors R-3 and R-4. The bases of the transistors T-1 and T-2 are connected to the positive terminal 11 through resistors R-5 and R-6, respectively, and the bases of the transistors T-3 and T-4 are connected to the negative terminal 12 through resistors R-7 and R-8, respectively. The collector of transistor T-1 is connected to the collector of transistor T-3, and the collector of transistor T-2 is connected to the collector of transistor T-4.

It will be seen, therefore, that each of the pairs of transistors constitutes a flip-flop and that the four transistors are connected in the respective arms of a bridge to two of the diagonal terminals of which, constituting the nput to the bridge, the D.C. input voltage is applied. The junctions 13 and 14 of the collectors constitute the output terminals of the bridge. The circuit is bistable in operation, T-1 and T-4 conducting while T-2 and T-3 are non-conducting, and vice versa, until their respective states are changed from one to the other by a suitable input or trigger signal.

In the form of the circuit illustrated in FIG. 1, a negative trigger signal is employed to effect the switching operation. To this end, the anodes of two semiconductor diodes D-1 and D-2 are connected to the bases of transistors T-3 and T-4, respectively, the cathodes of these diodes being coupled via a conductor 15 to the output of a suitable signal generator or oscillator indicated only schematically within the broken-line rectangle by reference numeral 16. The oscillator 16 in FIG. 1 is shown to be a unijunction relaxation oscillator, but any other type of signal generator or pulse source having a suitable rise time and amplitude may be used in lieu thereof. Since the details of any such oscillator constitute no part of the present invention, they are not further described herein.

The output of the inverter 10, as previously stated, is taken off across the terminals 13 and 14, and for the purpose of the present description of the invention, the load is shown as being constituted by the field coil 17 of a synchronous motor M and preferably one designed to operate at low speed and frequency, for example a small instrument motor or a stepping motor.

In operation, assuming that transistor T-1 is first biased to saturation so as to be conducting, transistor T-4 will likewise be biased to saturation through the collector of T-1 and resistor R-3, so that transistor T-4 also conducts. By virtue of the cross coupling or flip-flop arrangement of the pairs of transistors T-1, T-2 and T-3, T-4, transistors T-2 and T-3 will then be at cut-off and will remain non-conducting as long as a stable conducting condition exists with respect to transistors T-1 and T-4. At this time, the current flow in the circuit is from the positive voltage terminal 11 through the emitter and collector of transistor T-1, motor coil 17 from terminal 13 to terminal 14, and the collector and emitter of transistor T-4 to the negative voltage terminal 12.

In order to switch the circuit 10 to its second stable condition, a negative trigger pulse is applied to the diode steering circuit D-1, D-2. The pulse, which has no effect on the "off" transistor T-3 (being blocked from the base thereof by the reverse biased diode D-1), is applied through the forward biased diode D-2 to the base of the "on" transistor T-4 and turns the same "off." The decrease in collector current at T-4 is coupled to the base of transistor T-3 via resistor R-4 and drives T-3 into saturation, i.e. to turn "on," which is effective through the collector of T-3 and resistor R-1 to drive transistor T-2 into saturation, i.e. to turn "on," and concurrently through coupling resistor R-2 to turn transistor T-1 "off."

The current flow in the circuit is now from the positive terminal 11 through the emitter and collector of transistor T-2, coil 17 from terminal 14 to terminal 13, and the collector and emitter of transistor T-3 to the negative terminal 12, i.e. opposite to that occurring when transistors T-1 and T-4 are conducting. The next negative trigger pulse when applied to the diode steering circuit will be blocked from the "off" transistor T-4 by the diode D-2, but will be passed by diode D-1 to the "on" transistor T-3 to turn the same "off" together with transistor T-2, which again turns transistors T-1 and T-4 "on" to reestablish current flow in the first direction, i.e. through the motor coil 17 from terminal 13 to terminal 14. Further reversals of the direction of current flow thus will occur upon each subsequent application of a negative pulse to the diode steering circuit D-1, D-2 by the oscillator 16.

From the foregoing it will be understood that the reversal of the current through the motor coil 17 at each switching of the inverter circuit 10 from one stable state thereof to the other is tantamount to supplying to the coil an alternating current capable of operating the synchronous motor M. The utilization of the circuit 10 according to the present invention thus completely eliminates the need for a center-tapped coil, which is necessary when the motor is driven from a conventional flip-flop, and thereby appreciably increases the efficiency of the coil. Moreover, since the inverter circuit 10 according to the present invention does not include in its output any capacitors or transformers which would place a low frequency limit on the circuit, it is found to be well suited for use with stepper motors or the like requiring relatively great time intervals between successive trigger pulses.

During any given operation, of course, each complete cycle of operation of the inverter circuit, i.e. the switching thereof from one stable state to the other and back to the first, require two negative pulses. The oscillator 16 must, therefore, operate at twice the intended output frequency of the inverter circuit. Also, in accordance with usual practice, diodes 18, 19, 20 and 21 are connected across the emitter-collector circuits of the transistors T-1 to T-4, respectively, to minimize and quench reverse transient voltages generated by the inductive coil 17 during switching of the motor, so as to prevent possible breakdown of the transistors.

Referring now to FIG. 2, the inverter circuit 10' there shown is basically the same as that illustrated in FIG. 1, including two flip-flops composed of two cross-coupled, common-emitter PNP transistors and two cross-coupled, common-emitter NPN transistors, respectively. The bases of the two pairs of transistors are also connected to the positive and negative D.C. terminals 11 and 12 by resistors R-5 to R-8. The emitters of the PNP transistors T-1 and T-2, however, in lieu of being connected directly to the positive terminal 11, are connected to the latter through a resistor R-9, while the emitters of the NPN transistors T-3 and T-4 are connected to the negative terminal 12 through a resistor R-10. The function of the resistors R-9 and R-10 is to provide bias voltages to the resistors R-5 to R-8 to reverse bias the respective transistors in their "off" condition.

In operation, the current flow when T-1 and T-4 are conducting is from the positive terminal 11 through resistor R-9, the emitter and collector of transistor T-1, the motor coil 17 from terminal 13 to terminal 14, the collector and emitter of transistor T-4, and resistor R-10 to the negative terminal 12. The circuit 10', like the inverter circuit 10 of FIG. 1, is switched from this one of its stable states to the other by the application of a negative trigger pulse from oscillator 16 to the diode steering circuit D-1, D-2. With T-2 and T-3 thereupon conducting, the current flow is from the positive terminal 11 through resistor R-9, the emitter and collector of transistor T-2, the motor coil 17 from terminal 14 to terminal 13, the collector and emitter of transistor T-3, and resistor R-10 to the negative terminal 12. The next subsequent negative trigger pulse will again return the circuit to its first stable state, and so on, thereby producing the successive current reversals which are tantamount to alternating currents induced in the motor coil. The circuit 10' too is characterized by the absence of any transformers or capacitors in its output and thus is free of any low frequency limit which such elements would place on the circuit.

The inverter circuitry of the present invention may be modified in a number of ways, none of which involves any departure from the spirit and scope of the present invention. Merely by way of example, positive trigger pulses could be used in lieu of negative pulses, but in such a case the diode steering circuit, with the anodes and cathodes of diodes D-1 and D-2 properly oriented, would have to be connected to the bases of the PNP transistors T-1 and T-2. Also, if operating conditions permit, it is possible to employ capacitor steering in lieu of diodes D-1 and D-2. In the circuit 10' of FIG. 2, moreover, it is possible and within the purview of the present invention to develop across resistors R-5 to R-8 bias voltages which are independent of current flow. This would be achieved by replacing resistors R-9 and R-10 with forward biased diodes (not shown).

In general, for the purposes of starting small motors as set forth hereinbefore, a D.C. input voltage between about 20 and 48 volts and preferably between about 22 and 30 volts applied across the terminals 11 and 12 is found to be satisfactory, but it will be understood that the input voltage may be higher or lower than these values, depending on the particular application of the circuit.

The following tabulation of circuit components and parameters of a representative inverter circuit of the type shown in FIG. 2 is given merely for purposes of illustration and not by way of limitation:

| | |
|---|---|
| D.C. input voltage | 25 volts. |
| Transistors T-1, T-2 | 2N525. |
| Transistors T-3, T-4 | 2N696. |
| Resistor R-1 | 2.7K. |
| Resistor R-2 | 2.7K. |
| Resistor R-3 | 2.7K. |
| Resistor R-4 | 2.7K. |
| Resistor R-5 | 2.7K. |
| Resistor R-6 | 2.7K. |
| Resistor R-7 | 2.7K. |
| Resistor R-8 | 2.7K. |
| Resistor R-9 | 4.7K. |
| Resistor R-10 | 4.7K. |
| Diodes D-1, D-2 | 1N462A. |
| Motor D.C. resistance | 110 ohms. |
| Oscillator 16 (freq.) | 120 pulses/sec. |
| Diodes 18, 19, 20, 21 | 1N462A. |

The circuits according to the present invention may, if desired, be produced in hand-wired form or as printed circuits on boards in accordance with standard practice. In either case the resultant unit is extremely compact and light in weight, and is thus found highly suited for use in various missile and aircraft as well as other non-military commercial applications.

Having thus described my invention, what I claim and desire to secure by Letters Patent is:

1. In combination, an alternating current motor having a field coil, a pair of bistable flip-flops the first of which comprises two PNP transistors in a common-emitter configuration and the second of which comprises two NPN transistors in a common-emitter configuration, the collectors of said PNP transistors being connected, respectively, to the collectors of said pair of NPN transistors, said flip-flops thereby being connected back-to-back and defining a bridge circuit the input terminals of which are constituted by the emitter junctions and the output terminals of which are constituted by the collector junctions, said field coil of said motor being connected to said output terminals, a source of D.C. voltage having its positive terminal connected to the emitter junction of said PNP transistors and its negative terminal connected to the emitter junction of said NPN transistors, a steering circuit connected to the bases of said transistors of one of said flip-flops, and oscillator means coupled to said steering circuit and arranged to provide trigger signals of predetermined polarity to be applied successively to the bases of said transistors of said one flip-flop, whereby the successive trigger signals change said flip-flops back and forth between the stable states thereof so as to effect, without the intermediary of coupling transformers or capacitors, alternating reversals of the current flow through said motor field coil between said output terminals.

2. The combination of claim 1, said steering circuit comprising a plurality of semiconductor diodes.

3. The combination of claim 1, said oscillator means providing negative trigger signals, and said steering circuit being connected to said NPN transistors.

4. In combination, an alternating current motor having a field coil, a pair of PNP transistors in a common-emitter configuration, a pair of NPN transistors in a common-emitter configuration, respective first resistance means coupling the base of each PNP transistor to the collector of the other PNP transistor, respective second resistance means coupling the base of each NPN transistor to the collector of the other NPN transistor, the collectors of said pair of PNP transistors being connected, respectively, to the collectors of said pair of NPN transistors, said pairs of transistors thereby constituting a pair of complementary bistable flip-flops connected back-to-back to define a bridge circuit the input terminals of which are constituted by the emitter junctions and the output terminals of which are constituted by the collector junctions, said field coil of said motor being connected to said output terminals, a source of D.C. voltage having its positive terminal connected to the emitter junction of said PNP transistors and its negative terminal connected to the emitter junction of said NPN transistors, a diode steering circuit connected to the bases of one of said pairs of transistors, and oscillator means coupled to said diode steering circuit and arranged to provide trigger signals of predetermined polarity to be applied successively to the bases of said one pair of transistors, whereby the successive trigger signals change said flip-flops back and forth between the stable states thereof so as to effect, without the intermediary of coupling transformers or capacitors, alternating reversals of the current flow through said motor field coil between said output terminals.

5. The combination of claim 4, said oscillator means providing negative trigger signals, and said diode steering circuit being connected to said NPN transistors.

6. In combination, an alternating current motor having a field coil, a source of D.C. voltage, a pair of PNP transistors in a common-emitter configuration, a pair of NPN transistors in a common-emitter configuration, first bias resistors connected, respectively, between the bases of said PNP transistors and the positive terminal of said D.C. voltage source, second bias resistors connected, respectively, between the bases of said NPN transistors and the negative terminal of said D.C. voltage source, respective first resistance means coupling the base of each PNP transistor to the collector of the other PNP transistor, respective second resistance means coupling the base of each NPN transistor to the collector of the other NPN transistor, the collectors of said pair of PNP transistors being connected, respectively, to the collectors of said pair of NPN transistors, said pairs of transistors thereby constituting a pair of complementary bistable flip-flops connected back-to-back to define a bridge circuit the input terminals of which are constituted by the emitter junctions and the output terminals of which are constituted by the collector junctions, said field coil of said motor being connected to said output terminals, first current control means connected between the emitter junction of said PNP transistors and the positive terminal of said D.C. voltage source, second current control means connected between the emitter junction of said NPN transistors and the negative terminal of said D.C. voltage source, a steering circuit connected to the bases of one of said pairs of transistors, and oscillator means coupled to said steering circuit and arranged to provide trigger signals of predetermined polarity and frequency to be applied successively to the bases of said one pair of transistors, whereby the successive trigger signals change said flip-flops back and forth between the stable states thereof so as to effect, without the intermediary of coupling transformers or capacitors, alternating reversals of the current flow through said motor field coil between said output terminals.

7. The combination of claim 6, said first and second current control means comprising resistors.

8. The combination of claim 6, said steering circuit comprising a plurality of semiconductor diodes connected to said bases of said NPN transistors, and said oscillator means providing negative trigger signals at a frequency which is double the intended frequency of current reversal in said field coil.

References Cited by the Examiner

UNITED STATES PATENTS

| | | | |
|---|---|---|---|
| 2,995,690 | 8/1961 | Lemon | 318—138 |
| 2,997,665 | 8/1961 | Sylvan | 331—113 |
| 3,009,089 | 11/1961 | Collins | 318—171 X |
| 3,172,059 | 3/1965 | Freeborn | 331—113.1 |

ORIS L. RADER, *Primary Examiner.*

G. A. FRIEDBERG, *Assistant Examiner.*